United States Patent
Boeve et al.

(10) Patent No.: US 7,937,845 B2
(45) Date of Patent: May 10, 2011

(54) LOW COST ELECTRONIC COMPASS WITH 2D MAGNETOMETER

(75) Inventors: Hans Marc Bert Boeve, Hechtel-Eksel (BE); Teunis Jan Ikkink, Geldrop (NL); Haris Durc, Eindhove (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 12/594,233

(22) PCT Filed: Mar. 27, 2008

(86) PCT No.: PCT/IB2008/051146
§ 371 (c)(1),
(2), (4) Date: Oct. 1, 2009

(87) PCT Pub. No.: WO2008/120149
PCT Pub. Date: Oct. 9, 2008

(65) Prior Publication Data
US 2010/0115779 A1    May 13, 2010

(30) Foreign Application Priority Data
Apr. 2, 2007   (EP) .................................. 07105463

(51) Int. Cl.
*G01C 17/30* (2006.01)
*G01C 21/00* (2006.01)

(52) U.S. Cl. .................................................... 33/355 R

(58) Field of Classification Search ................ 33/355 R, 33/361, 362, 352, 356, 357
See application file for complete search history.

(56) References Cited

U.S. PATENT DOCUMENTS

| | | | | |
|---|---|---|---|---|
| 4,462,165 A * | 7/1984 | Lewis | .............. | 33/361 |
| 4,725,957 A | 2/1988 | Alberter et al. | | |
| 4,767,988 A * | 8/1988 | Wilson | ........ | 33/355 R |
| 4,797,841 A * | 1/1989 | Hatch | ........ | 33/355 R |
| 4,995,165 A * | 2/1991 | Daniels | .............. | 33/361 |
| 5,161,311 A * | 11/1992 | Esmer et al. | ......... | 33/356 |
| 6,836,971 B1 | 1/2005 | Wan | | |
| 2004/0236510 A1* | 11/2004 | Ockerse et al. | ......... | 33/355 R |
| 2008/0284650 A1* | 11/2008 | MacIntosh et al. | ......... | 702/141 |
| 2008/0294581 A1* | 11/2008 | Ikkink et al. | ......... | 706/46 |
| 2009/0239586 A1* | 9/2009 | Boeve et al. | ......... | 702/150 |
| 2010/0017160 A1* | 1/2010 | Ikkink et al. | ......... | 33/356 |
| 2010/0053789 A1* | 3/2010 | Duric et al. | ......... | 360/31 |
| 2010/0121599 A1* | 5/2010 | Boeve et al. | ......... | 33/356 |

FOREIGN PATENT DOCUMENTS
WO   2006/117731 A   11/2006

* cited by examiner

*Primary Examiner* — Yaritza Guadalupe-McCall

(57) ABSTRACT

An electronic compass has a 2D magnetometer for determining two of the three components of the earth-magnetic field vector. Values for the magnitude and inclination of the field at the location of the device are given. If at least one of the body axes of the device is held horizontally in operational use, an educated guess can be made about the actual orientation of the device (e.g., heading and tilt angles) with respect to the earth. Accordingly, this compass is a very-low cost device.

6 Claims, 3 Drawing Sheets

(202)  $(\mathbf{g} \cdot \mathbf{B}) = g_y B_{1,y} + g_z B_{1,z} = K$ (204)  $(\mathbf{g} \cdot \mathbf{B}) = g_y B_{2,y} + g_z B_{2,z} = K$ (206)  $(g_y)^2 + (g_z)^2 = 1$ (208)  $\begin{cases} g_y B_{1,y} + g_z B_{1,z} = K \\ (g_y)^2 + (g_z)^2 = 1 \end{cases}$ (210)  $\begin{cases} g_y B_{2,y} - g_z B_{2,z} = K \\ (g_y)^2 + (g_z)^2 = 1 \end{cases}$ Legend:

$B_{1,y}$ = component of earth-magnetic field vector candidate 1 along y-axis $B_{1,z}$ = component of earth-magnetic field vector candidate 1 along z-axis $B_{2,y}$ = component of earth-magnetic field vector candidate 2 along y-axis $B_{2,z}$ = component of earth-magnetic field vector candidate 2 along z-axis $g_y$ = component of gravity vector along y-axis $g_z$ = component of gravity vector along z-axis $K$ = value of dot product at location of device 100

Fig.2

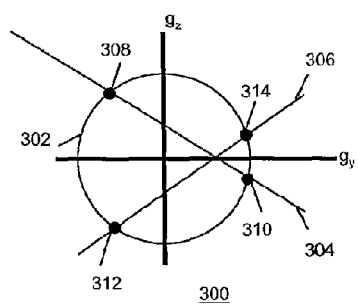

Fig.3

$$(402) \quad g_{11,y} = \frac{K \cdot B_{1,y} - B_{1,z}\sqrt{B_{1,y}^2 + B_{1,z}^2 - K^2}}{B_{1,y}^2 + B_{1,z}^2}$$

$$g_{11,z} = \frac{K \cdot B_{1,z} + B_{1,y}\sqrt{B_{1,y}^2 + B_{1,z}^2 - K^2}}{B_{1,y}^2 + B_{1,z}^2}$$

$$(404) \quad g_{12,y} = \frac{K \cdot B_{1,y} + B_{1,z}\sqrt{B_{1,y}^2 + B_{1,z}^2 - K^2}}{B_{1,y}^2 + B_{1,z}^2}$$

$$g_{12,z} = \frac{K \cdot B_{1,z} - B_{1,y}\sqrt{B_{1,y}^2 + B_{1,z}^2 - K^2}}{B_{1,y}^2 + B_{1,z}^2}$$

$$(406) \quad g_{21,y} = \frac{K \cdot B_{2,y} - B_{2,z}\sqrt{B_{2,y}^2 + B_{2,z}^2 - K^2}}{B_{2,y}^2 + B_{2,z}^2}$$

$$g_{21,z} = \frac{K \cdot B_{2,z} + B_{2,y}\sqrt{B_{2,y}^2 + B_{2,z}^2 - K^2}}{B_{2,y}^2 + B_{2,z}^2}$$

$$(408) \quad g_{22,y} = \frac{K \cdot B_{2,y} + B_{2,z}\sqrt{B_{2,y}^2 + B_{2,z}^2 - K^2}}{B_{2,y}^2 + B_{2,z}^2}$$

$$g_{22,z} = \frac{K \cdot B_{2,z} - B_{2,y}\sqrt{B_{2,y}^2 + B_{2,z}^2 - K^2}}{B_{2,y}^2 + B_{2,z}^2}$$

Fig.4

LOW COST ELECTRONIC COMPASS WITH 2D MAGNETOMETER

FIELD OF THE INVENTION

The invention relates to an electronic device comprising an orientation sensor with a two-dimensional magnetometer.

BACKGROUND ART

U.S. Pat. No. 6,836,971 discloses a tilt-compensated electronic compass. Its operation is based on calculating, rather than on measuring, the earth's magnetic field component Z in a direction orthogonal to the two measurement axes of a 2-axis magnetic sensor. The orthogonal component Z can be calculated using a stored value for the earth's magnetic field strength applicable over a wide geographic region. The calculation also requires using measured field values from the 2-axis sensor. Once Z is known, and using input from a 2-axis tilt sensor, the compensated orthogonal components X and Y can be calculated by mathematically rotating the measured field strength values from a tilted 2-axis sensor back to the local horizontal plane.

SUMMARY OF THE INVENTION

The invention relates to an orientation sensor and tilt-compensated compass vector-reconstruction method that uses just a single 2D magnetometer as its sensory input. In contrast with known tilt-compensated compasses, an example of which is described in U.S. Pat. No. 6,836,971 referred to above, no accelerometer is needed in this invention. Thus, the invention represents the ultimate lowest-cost tilt-compensated compass concept imaginable. In order to accomplish this, one of the three degrees of freedom in rigid-body attitude is sacrificed as a free variable. In practice this can be accomplished by requiring the compass to be held such that the body's x-axis is horizontal. Although this represents a restriction, its impact is low in operational use. For example, in an embodiment of the invention, the compass is integrated within a mobile telephone. Such a telephone is typically held with the body's x-axis horizontal, when the user is reading the display. Accordingly, one of the two degrees of freedom of the x-axis orientation of the device can be determined in advance when considering operational use of the device.

Accordingly, the inventors propose an electronic device comprising an orientation sensor with a two-dimensional magnetometer. The sensor is operative to supply a first signal and a second signal for determining first and second components, respectively, of the three-dimensional earth-magnetic field vector at a geographic location of the device. The device has first means for determining multiple candidates for the third component of the earth-magnetic field vector based on the first and second components and on a given strength of the earth-magnetic field at the geographic location of the device. The device has second means for determining multiple further candidates for the gravity vector, based on a given inclination and a given strength of the earth-magnetic field vector at the geographic location of the device, assuming that an axis of the device is being held horizontally. The device has third means for selecting a relevant one of multiple candidates for the third component of the earth-magnetic field vector and for selecting a further relevant one of the multiple further candidates for the gravity vector.

The invention is based on the following assumptions: the values are known of the magnitude and inclination of the earth-magnetic field at the location of the device; at least one of the body axes of the device is being held horizontally in operational use of the device. Based on these assumptions, an educated guess can be made about the actual orientation of the device (and about derivative quantities, such as heading and tilt angles) with respect to the earth.

The first means and/or second means and/or third means, introduced above, can be implemented in hardware, or by using a dedicated microcontroller, or a general-purpose data processor running dedicated software instructions.

In an embodiment of the invention, the values of the magnitude and inclination of the earth-magnetic field can be assumed constant under circumstances and be programmed in at the manufacturing phase as given constants.

Alternatively, the device of the invention is to obtain the magnitude and inclination for the earth magnetic field at the geographic location of the device. This can be accomplished in a variety of ways.

In a first example embodiment, the device of the invention has fourth means, e.g., a GPS unit, for determining its geographic position, or an interface to a GPS unit. The position can be mapped to the local values of the earth-magnetic strength and inclination, e.g., by using an onboard look-up table storing the values for a region or the whole planet or by using a mathematical model, such as the world magnetic model, to calculate the earth-magnetic properties from the geographical location, or, if the device has a telecommunication apparatus, by communicating via a wireless connection the position data to a service provider, who in return sends or uploads the local values to the device.

In a second example embodiment, the device comprises a telecommunications apparatus, e.g., a mobile telephone. Such an apparatus operates in a cellular infrastructure of the service provider. Each cell covers a geographic area within which a roaming mobile telephone user communicates wirelessly with the cell's beacon. The service provider therefore knows in which cell the user is present. Accordingly, an identifier of the beacon of the cell wherein the user is present can be used to determine the user's geographic position with a resolution of a characteristic dimension of the cell. This position can then, in turn, be used to look-up the associated earth-magnetic field strength and inclination. For example, a look-up table can be stored at the device that maps a beacon identifier, received from the beacon, to the local values of the earth-magnetic strength and inclination. As another example, a look-up table can be used to map the beacon identifier onto a geographical location, which in turn can be mapped onto the local earth-magnetic field properties by either another look-up table or a mathematical model such as the world magnetic model. As yet another example, the service provider has the beacon transmitting the local values to the device of the user during operational use of the device.

The invention also relates to a method of providing a service to a user of an electronic device that comprises an orientation sensor with a two-dimensional magnetometer. The sensor is operative to supply a first signal and a second signal for determining first and second components, respectively, of the three-dimensional earth-magnetic field vector at a geographic location of the device. The method comprises following steps. Data is received representative of the first and second signals. Multiple candidates are determined for the third component of the earth-magnetic field vector based on the first and second components, and on a given strength of the earth-magnetic field at the geographic location of the device. Multiple further candidates are determined for the gravity vector, based on a given inclination and a given strength of the earth-magnetic field vector at the geographic location of the device, assuming that an axis of the device is being held horizontally. A relevant one of multiple candidates is selected for the third component of the earth-magnetic field vector. A further relevant one of the multiple further candidates is selected for the gravity vector. Then, further data is determined representative of an attitude of the device based on the first and second components of the earth-magnetic field, and based on the selected candidate and on the selected further candidate.

Such a method is commercially interesting to a service provider who receives from an electronic device of a subscriber the sensor data, e.g., via a wireless data network, and carries out the calculations at a server. The results of the calculations represent the device's attitude with respect to the earth. The results are returned to the device via the data network.

The invention also relates to software for use on an electronic device that comprises an orientation sensor with a two-dimensional magnetometer. The sensor is operative to supply a first signal and a second signal for determining first and second components, respectively, of the three-dimensional earth-magnetic field vector at a geographic location of the device. The software comprises instructions for carrying out following steps: determining multiple candidates for the third component of the earth-magnetic field vector based on the first and second components, and on a given strength of the earth-magnetic field vector at the geographic location of the device; determining multiple further candidates for the gravity vector, based on a given inclination and a given strength of the earth-magnetic field vector at the geographic location of the device, assuming that an axis of the device is being held horizontally; selecting a relevant one of multiple candidates for the third component of the earth-magnetic field vector; selecting a further relevant one of the multiple further candidates for the gravity vector; and determining further data representative of the attitude of the device based on the first and second components of the earth-magnetic field vector, and based on the selected candidate and on the selected further candidate.

Accordingly, the software is commercially interesting, for example as an add-on, in combination with the sensor of the type described above, to an electronic device accommodating a data processor, e.g., a mobile telephone.

BRIEF DESCRIPTION OF THE DRAWING

The invention is explained below in further detail, by way of example and with reference to the accompanying drawing, wherein:

FIGS. 2 and 4 are overviews of formulae for explaining the operation of the device of FIG. 1; and FIG. 3 is a diagram illustrating relationships addressed by the formulae of FIG. 2.

DETAILED EMBODIMENTS

Figure 1:
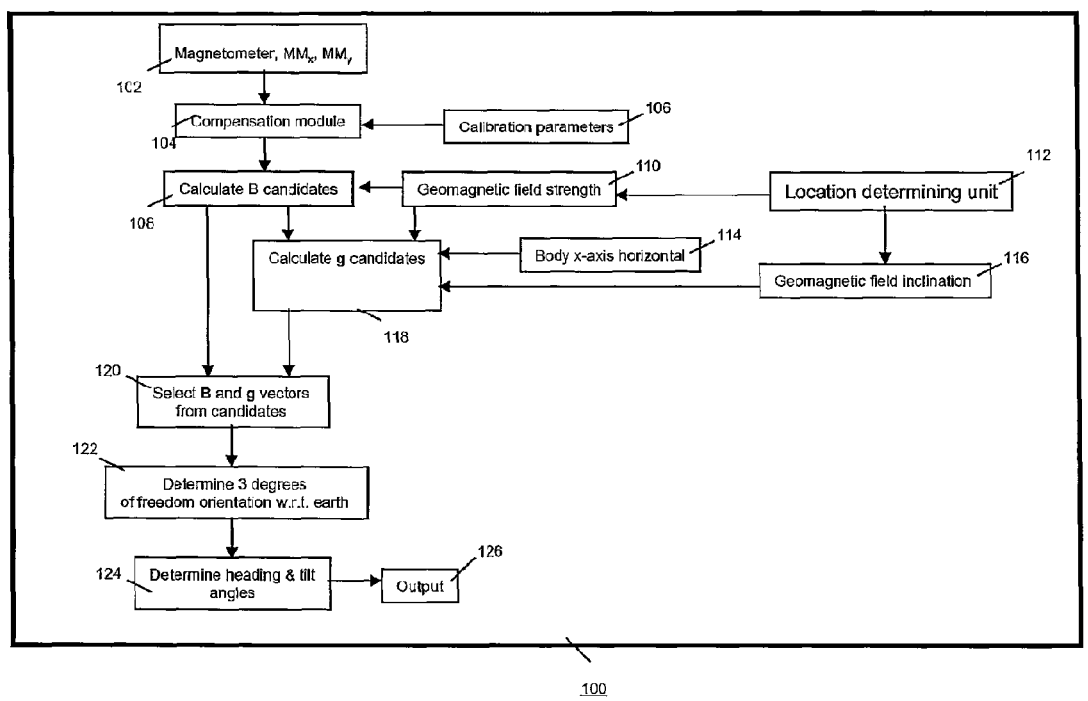
FIG. 1 is a block diagram of functionalities in a device of the invention.

FIG. 1 is a functionality diagram of an electronic device 100 in the invention. Device 100 comprises a 2D magnetometer 102 that supplies signals $MM_x$ and $MM_y$. From these signals, two of the three orthogonal components are determined that specify the earth-magnetic field vector at the geographic location of device 100 with respect to a coordinate system fixed to device 100. This coordinate system has an x-axis, a y-axis perpendicular to the x-axis, and a z-axis perpendicular to both the x-axis and the y-axis. The components of the earth-magnetic field in the directions of the x-axis and y-axis, are referred to here as $B_x$ and $B_y$, respectively. Device 100 has a compensation module 104 for compensating signals $MM_x$ and $MM_y$ for, e.g., offsets, sensitivity, misalignment, etc. The output of compensation module 104 is representative of the components of the earth-magnetic field vector B along two orthogonal directions in the coordinate system of device 100. Compensation module 104 receives calibration parameters from a calibration unit 106. Calibration unit 106 is, e.g., a memory storing parameter values determined in advance. Alternatively, calibration unit 106 carries out an auto-calibration process. The two orthogonal components of the earth-magnetic field vector B that are determined by compensation module 104 are supplied to a module 108, which calculates two candidates for the vector B. Module 108 is connected to a module 110 that supplies information about the strength of the earth-magnetic field at the location of device 100. The strength equals the magnitude of the earth-magnetic field vector. Accordingly, the given strength enables to find two candidate solutions for the value of the third component of vector B along the direction perpendicular to the first two directions, as the sum of squares of the three components is to equal the strength squared. The two candidate solutions for the third component lead to two corresponding candidate solutions for the vector B.

Module 110 receives the value of the local strength from a module 112 that looks up the current geographic position of device 100 on a geographic map of the earth-magnetic field. The geographic position of device 100 can be determined in a variety of ways. For example, module 112 has a GPS unit (not shown) that determines the position directly, and a memory (not shown) storing the relevant parameters of the earth-magnetic field as a function of geographic position or software implementing a mathematical model such as the world magnetic model. Alternatively, module 112 has a GPS unit that determines the position of device 100 and a telecommunication unit (not shown) for communication in a wireless fashion via a data network with a server elsewhere. The telecommunications unit then communicates to the server the current position of device 100, whereupon the server determines the parameters of the earth-magnetic field relevant to the current position of device 100 and submits them to device 100 via the data network. Another alternative is that device 100 comprises a mobile telecommunications device, such as a cell phone. The infrastructure of the telecommunications service enables to determine the geographic position of a cell phone, at least with the resolution of a dimension of a cell in the geographical area covered by the service. This position can then again be tied to the relevant local parameters of the earth-magnetic field, by having the server send to their clients these parameters per cell, or by having the cell identification send to client device 100, wherein device 100 then can determine its geographic position and the relevant parameters of the earth magnetic field using, e.g., tables of these quantities stored in a memory (not shown) accommodated in device 100, or a mathematical model such as the world magnetic model.

As mentioned above, module 108 determines two candidate solutions for the earth-magnetic field vector B. In the remainder of this text, these candidate solutions will be referred to as $B_1$ and $B_2$. In order to be able to determine the attitude of device 100, solutions have to be found for the earth's gravity vector g as well. Assume that the x-axis is being held horizontally. Optionally, this could be explicitly confirmed by the user to device 100 via a module 114 that comprises, e.g., a leveling device akin to a carpenter's spirit level or a mercury switch. Then, the gravity vector does not have a component along this x-axis. The dot-product of the gravity vector and the measured earth-magnetic field vector is then related to the components $B_y$ and $B_z$, but not to $B_x$. Module 112 supplies location information to a module 116, which determines the inclination angle of the earth-magnetic field at the current location of device 100, in one of the ways similar to those discussed above with respect to the earth-magnetic field strength. The inclination angle is the angle at which the earth-magnetic field lines intersect the surface of the earth. In other words, it is the angle that the earth-magnetic field vector B makes with the horizontal plane. This angle ranges from minus ninety degrees at the magnetic south pole, via zero degree around the equator, to plus ninety degrees at the magnetic north pole. From the magnetic field strength and the inclination angle, the dot-product of the gravity vector g with the earth-magnetic field B can be calculated. Since the x-component of the gravity vector g is assumed to be zero ($g_x=0$), the other components of vector g, $g_y$ and $g_z$ have to comply with equation (202) of FIG. 2 in the case of earth-magnetic field vector candidate $B_1$ or with equation (204) of FIG. 2 in the case of earth-magnetic field vector candidate $B_2$. Both equations (202) and (204) relate the vector components to the vector dot-product. The magnitude of the normalized gravity vector is unity as expressed in equation (206) of FIG. 2. Accordingly, solutions for gravity vector components $g_y$ and $g_z$ can be found from equations (208) and (210). In order to visualize this, consider FIG. 3.

FIG. 3 is a diagram 300 showing horizontally the $g_y$-axis and vertically the $g_z$-axis spanning up the $g_y$, $g_z$ plane. Centered on the origin where the axes intersect is a circle 302 representing equation (206). A line 304 corresponds to equation (202) and a line 306 corresponds to equation (204). The intersections of line 304 with circle 302 correspond to solutions for gravity vector components $g_y$ and $g_z$ that in turn correspond with earth-magnetic field vector candidate $B_1$. These solutions are given by expressions 402 and 404 in FIG. 4. Likewise, the intersections of line 306 with circle 302 correspond to solutions for gravity vector components $g_y$ and $g_z$ that in turn correspond with earth-magnetic field vector candidate $B_2$. These solutions are given by expressions 406 and 408 in FIG. 4. In general, therefore, a total of four candidate solutions $g_{11}$, $g_{12}$, $g_{21}$ and $g_{22}$ exist for gravity vector g. However, if the discriminant (i.e., the argument in the square-root factor) in expressions (402)-(408) becomes zero, these solutions become degenerate either for expressions (402) and (404) or for expressions (406) and (408). This situation corresponds to line 304 or 306 being tangent to circle 302, so that their respective points of intersection coincide. This happens if the body x-axis is directed north or south. If the x-axis is not held perfectly horizontally, the discriminant of some solutions may even become negative. In that case, one or both of lines 304 and 306 do not intersect circle 302. If the discriminant becomes negative, there is no exact solution for gravity vector g. One may then approximate such a solution by proceeding as if the discriminant were zero.

A module 118 carries out above process of determining the possible components of gravity vector g, based on inputs received from modules 108, 116, and 114.

There are two candidate solutions for vector B, and for each thereof there are two candidate solutions for vector g. This yields a total number of four candidate solutions for vector g, corresponding to four candidate attitudes. The correct solution is the candidate that corresponds to the actual attitude of device 100. Selection of the correct solution amidst the three spurious solutions proceeds as follows Assume that the correct solution has been selected at previous time instants. Then at the current time instant, a solution can be preliminarily selected based on achieving optimal continuity from the historically selected solution. The historically selected solution may be the solution selected at the previous time instant or it may be an average of solutions selected at previous time instants. For each of both B candidates the most likely g candidate can be pre-selected, based on the criterion of optimal continuity of the g candidates with the historically selected g solution. This step reduces the total number of solutions to be further evaluated from four to two. If for a given B candidate the discriminant of the solutions for the g vector is substantially larger than zero, the g vector solution that gives optimal continuity is the one which minimizes the vectorial distance to the historically selected g vector solution. If the discriminant is only marginally larger than zero then the points of intersection of line 304 or 306 with circle 302 approach each other closely. Inaccuracies such as noise associated with the measured signals $MM_X$ and $MM_Y$ then increase the probability of pre-selecting the wrong g vector candidate. This problem can be alleviated to some extent by noting that the attitude of device 100 may be dynamically, but smoothly, changing. Thus, a different criterion for optimal continuity can be opportune in this situation: that specific g vector candidate is pre-selected whose vectorial difference with the historically selected g vector solution best matches a similar vectorial difference calculated for the previous time instant. The criterion for best matching is that the solution results in the smallest vectorial distance of vectorial differences. In other words, that solution is selected which gives optimal continuity of the rate of change of the g vector. If the discriminant is zero then the two g vector solutions are indistinguishable (degenerate) and either one of them may be selected. If the discriminant is negative, it can be replaced by zero and either one of the degenerate solutions can be used as an approximate g vector solution.

The method described above reduces the total number of solutions to be further evaluated from four to two. At this stage there are still two B vector candidates, each one corresponding now with a single g vector candidate. Making a preliminary selection out of the two remaining candidates can be done based on the criterion of optimal continuity of the compound (stacked) vector $(B_x B_y B_z 0 g_y g_z)^T$. If the vectorial distance between the two compound vectors associated with both candidate solutions is substantially larger than zero, optimal continuity of the compound vector is achieved if that candidate is preliminary selected, whose associated compound vector has the smallest vectorial distance to the historically selected compound vector. The historically selected compound vector may be the compound vector of the previous time instant or it may be an average of compound vectors from previous time instants. If the vectorial distance between the two compound vectors associated with both candidate solutions is just marginally larger than zero, the probability of preliminary selecting the wrong solution due to system inaccuracies would increase unacceptably if the selection were done as described in the previous sentence. It is more reliable to preliminarily select the solution with the associated compound vector, whose vectorial difference with the historically selected compound vector best matches a similar vectorial difference calculated for the previous time instant.

At this stage a preliminary selection of the best candidate has been made. However, occasionally a spurious solution may still be selected, especially if the correct solution approaches a spurious solution closely at some point in time. Once a spurious solution has been selected, all subsequent solutions will be wrong as well, until the spurious solution approaches another solution closely enough that a new jump may occur. Thus a mechanism is provided that is able to discern spurious solutions from the correct solution. Since each of the spurious solutions corresponds to a valid attitude with the x-axis horizontal, additional attitude restrictions must be defined to allow distinction to be made between correct and spurious solutions. If the system is accidentally tracking a spurious solution, a changing attitude of device 100 may cause that spurious solution to enter a forbidden range of attitudes. When it is detected that the solution being tracked enters a forbidden range, this solution may be discarded in favor of another solution. Since there are three other solutions, a mechanism is provided to arrive at the correct solution with the highest probability. This can be achieved by performing the check on forbidden range violation not just after the last selection stage, but after each of the selection stages instead. So, the check is performed after a g-vector has been pre-selected for each B vector candidate and the check is also performed after the compound vector is preliminarily selected. Thus a total of three checks on forbidden range violations are performed. Above procedure can also be used as an initialization process if correct solutions at previous instants are not available.

As one example embodiment of a forbidden range definition and the corresponding checks consider the restriction that the tilt angle of the device 100 is restricted to the range [0 degrees, 90 degrees]. This implies $g_y \leq 0.0$ and $g_z \leq 0$. If at some stage a g vector solution is (pre-) selected that has either $g_y > 0$ or $g_z > 0$ then that g vector solution corresponds to a forbidden attitude and thus represents a spurious solution. If the other g vector solution in that selection stage (i.e., the solution not preselected) satisfies $g_y \leq 0$ and $g_z \leq 0$, then this other solution must be selected in that selection stage. If none of both g vector solutions happens to satisfy $g_y \leq 0$ and $g_z \leq 0$, then that one can be selected which is closest to the center of the allowed tilt interval, i.e. the solution for which $(g_y + \frac{1}{2}\sqrt{2})^2 + (g_z + \frac{1}{2}\sqrt{2})^2$ is minimal.

A module 120 performs the process described above. As $B_x$, $B_y$ and $B_z$ have now been determined with respect to a reference coordinate frame fixed to device 100, a module 122 determines the orientation of device 100 with respect to the earth. From the determined orientation of device 100 other quantities such as heading and tilt angles are calculated in a module 124 that supplies this as data to an output 126, e.g., a graphical user interface.

Above embodiments depend on determining the local magnitude and inclination of the earth-magnetic field based on the geographic position of device 100.

For use in a specific geographic region, it can be assumed that the magnitude and inclination are constant. That is, if the magnitude and inclination do vary within the specific region, the variations can be ignored for the practical purposes of the invention in operational use. The values of the magnitude and inclination could then be programmed in device 100, rendering device 100 suitable for the associated region.

Preferably, some or all of the functionalities of modules 104, 108, 110, 112, 116, 118, 120, 122 and 124 are implemented using software running on a general-purpose data processor (not shown), or they are implemented using a dedicated microcontroller (not shown).

The invention claimed is:

1. An electronic device comprising:
   an orientation sensor with a two-dimensional magnetometer, wherein:
   the sensor is operable to supply a first signal and a second signal for determining first and second components, respectively, of the three-dimensional earth-magnetic field vector at a geographic location of the device; and
   a data processor operable to determine multiple candidates for the third component of the earth-magnetic field vector based on the first and second components and on a given strength of the earth-magnetic field at the geographic location of the device;
   determine multiple candidates for the gravity vector, based on a given inclination and a given strength of the earth-magnetic field vector at the geographic location of the device, assuming that an axis of the device is being held horizontally;
   select a relevant one of multiple candidates for the third component of the earth-magnetic field vector,
   select a relevant one of the multiple candidates for the gravity vector and
   determine further data representative of the attitude of the device based on the first and second components of the earth magnetic field vector, and based on the selected candidates.

2. The device of claim 1, comprising a telecommunications apparatus.

3. The device of claim 1, wherein the device comprises fourth means for determining the geographic location.

4. The device of claim 1, wherein multiple candidates for the third component of the gravity vector include at least three candidates respectively corresponding to selected ones of the earth-magnetic field vector candidates.

5. A method of providing a service to a user of an electronic device that comprises an orientation sensor with a two-dimensional magnetometer, wherein:
   the sensor is operable to supply a first signal and a second signal for determining first and second components, respectively, of the three-dimensional earth-magnetic field vector at a geographic location of the device;
   wherein the method comprises:
   receiving data representative of the first and second signals;
   determining multiple candidates for the third component of the earth-magnetic field vector based on the first and second components, and on a given strength of the earth-magnetic field at the geographic location of the device;
   determining multiple further candidates for the gravity vector, based on a given inclination and a given strength of the earth-magnetic field vector at the geographic location of the device, assuming that an axis of the device is being held horizontally;
   selecting a relevant one of multiple candidates for the third component of the earth-magnetic field vector;
   selecting a relevant one of the multiple further candidates for the gravity vector;
   determining further data representative of the attitude of the device based on the first and second components of the earth-magnetic field vector, and based on the selected candidate and on the selected further candidate.

6. Software comprising instructions for implementing the method of claim 5.

* * * * *